(12) United States Patent
Funk et al.

(10) Patent No.: US 12,514,889 B2
(45) Date of Patent: Jan. 6, 2026

(54) **OXALIC ACID OR OXALATE FREE *INONOTUS OBLIQUUS* EXTRACT AND USES THEREOF**

(71) Applicant: The Better for You Company, LLC, Longboat Key, FL (US)

(72) Inventors: Richard M. Funk, Longboat Key, FL (US); Aaron Lopes, Longboat Key, FL (US)

(73) Assignee: The Better for You Company, LLC, Longboat Key, FL (US)

( * ) Notice: Subject to any disclaimer, the term of this patent is extended or adjusted under 35 U.S.C. 154(b) by 0 days.

(21) Appl. No.: 18/662,674

(22) Filed: May 13, 2024

(65) Prior Publication Data

US 2024/0292875 A1  Sep. 5, 2024

Related U.S. Application Data

(63) Continuation of application No. PCT/US2022/050314, filed on Nov. 17, 2022.

(60) Provisional application No. 63/281,273, filed on Nov. 19, 2021.

(51) Int. Cl.
*A61K 36/07* (2006.01)
*A23L 5/20* (2016.01)
*A23L 31/00* (2016.01)

(52) U.S. Cl.
CPC .............. *A61K 36/07* (2013.01); *A23L 5/276* (2016.08); *A23L 31/00* (2016.08)

(58) Field of Classification Search
CPC ................................ A61K 36/07; A23L 5/276
See application file for complete search history.

(56) References Cited

U.S. PATENT DOCUMENTS

| 2005/0220950 | A1* | 10/2005 | Kakuta | A23L 31/00 426/481 |
| 2010/0173390 | A1* | 7/2010 | Hjort | C12N 9/14 435/254.11 |
| 2011/0250226 | A1* | 10/2011 | Bae | A61P 29/00 424/195.15 |
| 2015/0150293 | A1* | 6/2015 | Kawahara | A23L 31/00 426/655 |
| 2016/0037814 | A1* | 2/2016 | Chatani | A23L 27/11 426/655 |
| 2018/0362955 | A1* | 12/2018 | Cowley | C12Y 401/01008 |
| 2020/0080070 | A1* | 3/2020 | Liu | A23K 20/189 |
| 2020/0108110 | A1* | 4/2020 | Antony | A61K 9/20 |

FOREIGN PATENT DOCUMENTS

KR    20050114303 A    * 12/2005

OTHER PUBLICATIONS

Bong et al., "Addition of calcium compounds to reduce soluble oxalate in a high oxalate food system", Food Chemistry 221, 2017, pp. 54-57, http://dx.doi.org/10.1016/j.foodchem.2016.10.031. (Year: 2017).*

(Continued)

*Primary Examiner* — Stephanie A Kohler
(74) *Attorney, Agent, or Firm* — ICE MILLER LLP; Justin D. Swindells

(57) ABSTRACT

Provided herein are methods for preparing *Inonotus obliquus* (chaga mushroom) extracts that are substantially free of oxalic acid or oxalate, and to food products containing such extracts.

27 Claims, 7 Drawing Sheets

(56) References Cited

OTHER PUBLICATIONS

Lee, S., et al., "Development of End Stage Renal Disease after Long-Term Ingestion of Chaga Mushroom: Case Report and Review of Literature", J Korean Med Sci., May 18, 2020, 35(19):6 pages.
International Search Report and Written Opinion of the ISA/US in PCT/US2022/050314, Mar. 28, 2023, 11 pages.

* cited by examiner

OXALIC ACID OR OXALATE FREE *INONOTUS OBLIQUUS* EXTRACT AND USES THEREOF

CROSS-REFERENCE TO RELATED APPLICATIONS

This application is a continuation of International Application No. PCT/US2022/050314 filed Nov. 17, 2022, which claims benefit under 35 U.S.C. § 119(e) of U.S. Provisional Patent Application No. 63/281,273 filed Nov. 19, 2021, both of which are incorporated herein by reference in their entirety.

TECHNICAL FIELD

The present disclosure relates generally to methods for preparing *Inonotus obliquus* (chaga mushroom) extracts that are substantially free of oxalic acid or oxalate, and to food products containing such extracts.

BACKGROUND

Oxalate/Oxalic Acid is a leading cause of kidney stones, and a key reason chaga tea and extract(s) are not or should not be consumed. Removing the oxalate/oxalic acid allows access to the benefits of chaga, without the negative potential side effects. Thus, there is need in the art for methods that can provide chaga mushroom extract that is substantially free of oxalic acid or oxalate. The present disclosure addresses this and other needs.

SUMMARY

Inventors have discovered inter alia that treating chaga mushroom (CM) extracts with $CaC_2$ can reduce oxalic acid or oxalate in the chaga mushroom extract. Accordingly, in one aspect, provided herein is a method for preparing a chaga mushroom extract that is substantially free of oxalic acid or oxalate.

In some embodiments, the method comprises: (a) extracting a chaga mushroom solid with a first solvent, optionally at an elevated temperature; (b) separating the solvent extract; (c) removing the first solvent from the solvent extract to obtain a crude chaga mushroom extract; (d) extracting the crude chaga mushroom extract with a second solvent (e.g., water) comprising a salt of an alkaline earth metal; and (e) separating the solvent extract to obtain a chaga mushroom extract, wherein the chaga mushroom extract is substantially free of oxalic acid or oxalate.

In some embodiments, the method comprises: (a) extracting a chaga mushroom solid with a first solvent, optionally at an elevated temperature; (b) separating the solvent extract; (c) removing the first solvent from the solvent extract to obtain a crude chaga mushroom extract; (d) extracting the crude chaga mushroom extract with a second solvent (e.g., water); and (e) adding a salt of an alkaline earth metal to the solvent extract to obtain a chaga mushroom extract, wherein the chaga mushroom extract is substantially free of oxalic acid or oxalate. It is noted that the solvent extract can be separated from the crude chaga mushroom extract prior to or after adding the salt.

Accordingly, in some embodiments, the method comprises: (a) extracting a chaga mushroom solid with a first solvent, optionally at an elevated temperature; (b) separating the solvent extract; (c) removing the first solvent from the solvent extract to obtain a crude chaga mushroom extract; (d) extracting the crude chaga mushroom extract with a second solvent (e.g., water); (e) separating the solvent extract; and (f) adding a salt of an alkaline earth metal to the second solvent to obtain a chaga mushroom extract, wherein the chaga mushroom extract is substantially free of oxalic acid or oxalate.

In some embodiments, the method comprises: (a) extracting a chaga mushroom solid with a first solvent, optionally at an elevated temperature; (b) separating the solvent extract; (c) removing the first solvent from the solvent extract to obtain a crude chaga mushroom extract; (d) extracting the crude chaga mushroom extract with a second solvent (e.g., water (e) adding a salt of an alkaline earth metal to the solvent extract; and (f) separating the solvent extract to obtain a chaga mushroom extract, wherein the chaga mushroom extract is substantially free of oxalic acid or oxalate.

In some embodiments, the method comprises: (a) extracting a chaga mushroom solid with a solvent comprising a solvent of salt of an alkaline earth metal, optionally at an elevated temperature; (b) separating the solvent extract; and (c) removing the solvent from the solvent extract to obtain a chaga mushroom extract, and wherein the chaga mushroom extract is substantially free of oxalic acid or oxalate.

In some embodiments, the method comprises: (a) extracting a chaga mushroom solid with a solvent, optionally at an elevated temperature; (b) optionally separating the solvent extract; and (c) adding a salt of an alkaline earth metal to the solvent extract to obtain a chaga mushroom extract, wherein the chaga mushroom extract is substantially free of oxalic acid or oxalate. It is n It is noted that the chaga mushroom extract is substantially free of oxalic acid or oxalate can be in form of a liquid, solid or semi-solid.

It is also noted that a solvent used in the extraction can be single solvent or a mixture of two or more solvents. For example, a solvent used in the extraction can be a binary solvent, e.g., ethanol/water mixture.

In some embodiments of any one of the aspects, the method for preparing the chaga mushroom extract further comprises a step of introducing the chaga mushroom extract into a liquid, a solid, or a semi-solid to form a food product.

The chaga mushroom extract described herein is substantially free of oxalic acid or oxalate. Further, the chaga mushroom extract described herein has excellent antioxidant properties. Thus, the chaga mushroom extract described herein can be used as an additive to increase the antioxidant properties of food products. Accordingly, in another aspect, the disclosure provides a food product comprising a chaga mushroom extract described herein. For example, a food product comprising a chaga mushroom extract and wherein the food product is substantially free of oxalic acid or oxalate.

It is noted that the food product comprising the chaga mushroom extract described herein can be a liquid, a solid or a semi-solid food product. Further, the food product can be any one of the food products to which a chaga extract can be added. Exemplary food products include, but are not limited to, beverages, dairy products, baked goods, confectionery and cereal products.

In some embodiments of any one of the aspects, the food product is tea, coffee, soft drink, juice drink, smoothie, milk, yogurt, cheese, nutritional supplement, dietary supplement, pre-mixed drink, meal replacement product, snack, trail mix, energy bar, powder, cake, cookie, cracker, bread, scone, muffin, custard, rice pudding, mousse, ice cream, sherbet, sorbet, or a confectionery product.

In yet another aspect, provided herein is a method for increasing the antioxidant activity of a food product. The method comprises adding a chaga mushroom extract described herein to a food product.

DETAILED DESCRIPTION

Figure 1A:
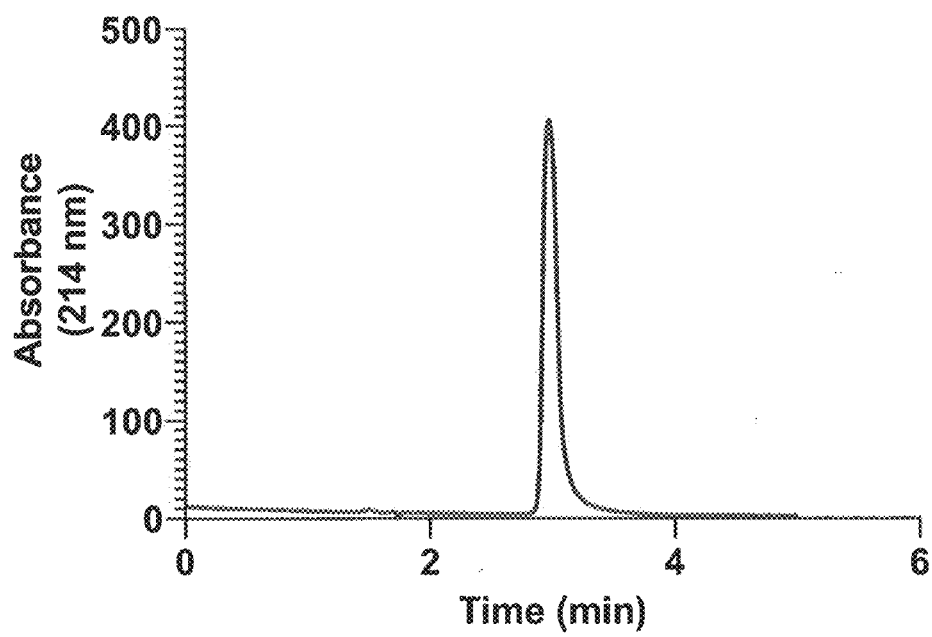
FIGS. 1A and 1B show validation of the High Performance Liquid Chromatography (HPLC) analysis.

In one aspect, the disclosure provides a method for preparing a chaga mushroom extract that is substantially free of oxalic acid or oxalate.

As used herein, "substantially free" means that the indicated component, e.g., oxalic acid or oxalate is present in an amount less than about 5% (v/v, w/v, or w/w) of the product, e.g., the chaga mushroom extract and/or a food product comprising the chaga mushroom extract. For example, the indicated component, e.g., oxalic acid or oxalate is present in an amount less than about 4.5%, or less than about 4%, or less than about 3.5%, or less than about 3%, or less than about 2.5%, or less than about 2%, or less than about 1.5%, or less than about 1%, or less than about 0.5%, or less than 0.25% (v/v, w/v, or w/w), or less than 0.20% (v/v, w/v, or w/w), or less than 0.15% (v/v, w/v, or w/w), or less than 0.05% (v/v, w/v, or w/w), or less than 0.01% (v/v, w/v, or w/w) of the product, e.g., the chaga mushroom extract and/or a food product comprising the chaga mushroom extract. In some embodiments, the indicated component, e.g., oxalic acid or oxalate is present in an undetectable amount. For example, the indicated component, e.g., oxalic acid or oxalate is present in an amount that is undetectable by HPLC, gas chromatography or mass spectrometry. In some embodiments, the indicated component, e.g., oxalic acid or oxalate is present in an amount that is undetectable by a HPLC method described herein.

In one aspect, provided herein is a method for preparing a chaga mushroom extract that is substantially free or generally bereft of oxalic acid or oxalate. Generally, the method comprises extracting a chaga mushroom solid in a first solvent, separating the solvent extract from the chaga mushroom solid, adding a salt of an alkaline earth metal to the separated solvent extract, and optionally removing the first solvent to obtained the chaga mushroom extract that is substantially free of oxalic acid or oxalate.

It is noted that the salt of an alkaline earth metal can be added to the first solvent prior to extracting the chaga mushroom solid with the first solvent. Thus, in some embodiments, a method comprises extracting a chaga mushroom solid in a first solvent comprising a salt of an alkaline earth metal, separating the solvent extract from the chaga mushroom solid, and optionally removing the first solvent to obtained the chaga mushroom extract that is substantially free of oxalic acid or oxalate.

In some embodiments of any one of the aspects, the first solvent comprises an alcohol. For example, the first solvent comprises ethanol. In some other embodiments of any one of the aspects, the first solvent is water.

The separated solvent can be processed prior to adding the salt of an alkaline earth metal. For example, the solvent can be dried to obtain a crude chaga mushroom extract, and the crude extract can be rehydrated in a second solvent. Accordingly, in some embodiments, the method comprises removing the solvent in the separated solvent extract to obtained a crude mushroom extract, rehydrating the crude mushroom extract with a second solvent, adding a salt of an alkaline earth metal to the second solvent comprising the crude chaga mushroom extract, and optionally removing the solvent to obtained the chaga mushroom extract that is substantially free of oxalic acid or oxalate.

It is noted that the salt of an alkaline earth metal can be present in the second solvent prior to extracting the crude mushroom extract with the second solvent. Thus, in some embodiments, the method comprises removing the solvent in the separated solvent extract to obtained a crude mushroom extract, extracting the crude mushroom extract with a second solvent comprising a salt of an alkaline earth metal, and optionally removing the solvent to obtained the chaga mushroom extract that is substantially free of oxalic acid or oxalate.

In some embodiments of any one of the aspects, the second solvent is water.

In some embodiments of any one of the aspects, the salt of an alkaline earth metal is calcium chloride.

In some embodiments, a method for preparing the chaga mushroom extract comprises: extracting a chaga mushroom solid in a first solvent; separating the first solvent extract from the chaga mushroom solid; removing the first solvent from the separated first solvent extract to obtain a crude chaga mushroom extract; extracting the crude chaga mushroom extract with a second solvent comprising a salt of an alkaline earth metal; separating the second solvent extract from the crude chaga mushroom extract; and optionally removing the second solvent from the separated second solvent extract to obtained the chaga mushroom extract that is substantially free of oxalic acid or oxalate.

It is noted that the step of extracting with the first solvent or the second solvent can be at an elevated temperature. As used herein, the term "elevated temperature" refers to a temperature higher than the immediate and unchanged surroundings of the extraction mixture. Generally, an elevated temperature is a temperature higher than room temperature, e.g. a temperature higher than about 50° C. For example, the elevated temperature can be a temperature of from about 55° C. to about 95° C., or from about 65° C. to about 90° C., or from about 75° C. to about 90° C., or from about 80° C. to about 88° C. In some embodiments, the elevated temperature is a temperature of from about 82° C. to about 87° C.

In some embodiments, the extraction with the first solvent is at an elevated temperature. For example, the step of extracting the chaga mushroom solid with the first solvent is at a temperature of from about 50° C. to about 99° C. Generally, the temperature for the extraction with the first solvent does not exceed 100° C. In some embodiments, the step of extracting the chaga mushroom solid with the first solvent is at a temperature of from about 55° C. to about 95° C., or from about 65° C. to about 90° C., or from about 75°

C. to about 95° C., or from about 80° C. to about 90° C. In some embodiments, the step of extracting the chaga mushroom solid with the first solvent is at a temperature of from about 87° C. to about 99° C. For example, the step of extracting the chaga mushroom solid with the first solvent is at a temperature of from about 90° C. to about 95° C., e.g., at a temperature of from about 92° C. to about 94° C., such as a temperature of about 93° C. In some embodiments, the step of extracting the chaga mushroom solid with the first solvent is at a temperature of from about 76° C. to about 88° C. For example, the step of extracting the chaga mushroom solid with the first solvent is at a temperature of from about 79° C. to about 85° C., e.g., at a temperature from about 81° C. to about 83° C., such as a temperature of about 82° C.

In some embodiments, the first solvent is water and the step of extracting the chaga mushroom solid with the first solvent is at a temperature of from about 87° C. to about 99° C. For example, the first solvent is water and the step of extracting the chaga mushroom solid with the first solvent is at a temperature of from about 90° C. to about 95° C. In some embodiments, the first solvent is water and the step of extracting the chaga mushroom solid with the first solvent is at a temperature of from about 92° C. to about 94° C., e.g., a temperature of about 93° C.

In some embodiments, the first solvent is mix of ethanol and water and the step of extracting the chaga mushroom solid with the first solvent is at a temperature of from about 76° C. to about 88° C. For example, the first solvent is a mix of ethanol and water and the step of extracting the chaga mushroom solid with the first solvent is at a temperature of from about 79° C. to about 85° C. In some embodiments, the first solvent is mix of ethanol and water and the step of extracting the chaga mushroom solid with the first solvent is at a temperature of from about 81° C. to about 83° C., e.g., a temperature of about 82° C.

In some embodiments, the step of extracting the chaga mushroom solid with the first solvent is at room temperature.

As used herein, the term "room temperature" refers to the temperature of the immediate and unchanged surroundings of the extraction mixture. Generally, a room temperature is a temperature from about 15° C. to about 40° C., or from about 15° C. to about 35° C., or from about 15° C. to about 30° C., or from about 15° C. to about 25° C., or from about 20° C. to about 30° C., or from about 20° C. to about 25° C.

In some embodiments, the extraction with the second solvent is at about room temperature.

In some embodiments, the chaga mushroom solid is extracted with a solvent, the solvent is separated from the solvent extract and a salt of an alkaline earth metal is added to the separated solvent. For example, the chaga mushroom solid is extracted with the solvent at an elevated temperature, the solvent is separated from the solvent extract and a salt of an alkaline earth metal is added to the separated solvent.

It is noted that the step of extracting with the first solvent or the second solvent can be any desired period of time. For example, the step of extracting with the first solvent or the second solvent can be independently carried out for a period of minutes to hours.

In some embodiments, the step of extracting with the first solvent is for a period of from about 5 minutes to about 72 hours, or from about 15 minutes to about 48 hours, or from about 30 minutes to about 36 hours, or from about 45 minutes to about 30 hours, or from about 60 minutes to about 24 hours. For example, the step of extracting with the first solvent is for a period of about 15 minutes, or about 30 minutes, or about 45 minutes, or about 60 minutes, or about 2 hours, or about 3 hours, or about 4 hours, or about 5 hours, or about 6 hours, or about 7 hours, or about 8 hours, or about 8 hours, or about 10 hours, or about 11 hours, or about 12 hours, or about 13 hours, or about 14 hours, or about 15 hours, or about 16 hours, or about 17 hours, or about 18 hours, or about 19 hours, or about 20 hours, or about 21 hours, or about 22 hours, or about 23 hours, or about 24 hours, or about 25 hours, or about 26 hours, or about 27 hours or about 28 hours, or about 29 hours, or about 30 hours. In some embodiments, the step of extracting with the first solvent is for a period of about 5 hours to about 15 hours. For example, the step of extracting with the first solvent is for a period of about 6 hours to about 14 hours, for a period of about 7 hours to about 13 hours, or for a period of about 8 hours to about 12 hours.

The step of extracting with the second solvent can be for a period of from about 5 minutes to about 72 hours, or from about 15 minutes to about 48 hours, or from about 30 minutes to about 36 hours, or from about 45 minutes to about 30 hours, or from about 60 minutes to about 24 hours. For example, the step of extracting with the first solvent is for a period of about 15 minutes, or about 30 minutes, or about 45 minutes, or about 60 minutes, or about 2 hours, or about 3 hours, or about 4 hours, or about 5 hours, or about 6 hours, or about 7 hours, or about 8 hours, or about 8 hours, or about 10 hours, or about 11 hours, or about 12 hours, or about 13 hours, or about 14 hours, or about 15 hours, or about 16 hours, or about 17 hours, or about 18 hours, or about 19 hours, or about 20 hours, or about 21 hours, or about 22 hours, or about 23 hours, or about 24 hours, or about 25 hours, or about 26 hours, or about 27 hours or about 28 hours, or about 29 hours, or about 30 hours. In some embodiments, the step of extracting with the second solvent is for a period of about 5 hours to about 15 hours. For example, the step of extracting with the second solvent is for a period of about 6 hours to about 14 hours, for a period of about 7 hours to about 13 hours, or for a period of about 8 hours to about 12 hours.

Embodiments of the various aspects described herein include a chaga mushroom solid. The chaga mushroom solid can be raw or homogenized chaga mushroom tissue. In some embodiments, the chaga mushroom solid can be in form of a powder.

Embodiments of the various aspects described herein include separating a solvent extract. One of ordinary skill in the art is well aware of methods and systems for separating a liquid from a mixture. Such methods include, but are not limited to filtration. Thus, in some embodiments, the step of separating the solvent extract comprises filtering the mixture.

Embodiments of the various aspects described herein include removing a solvent. Methods for removing solvents are well known in the art and available to one of ordinary skill in the art. Examples of methods for removing a solvent include, but are not limited to, natural drying, ventilation drying, heat drying, and/or reduced-pressure drying. Thus, in some embodiments, the step of removing the solvent comprises reduced-pressure drying. In some embodiments, the step of removing the solvent comprises heat drying. In some embodiments, the step of removing the solvent comprises ventilation drying. In some embodiments, the step of removing the solvent comprises natural drying.

Embodiments of the various aspects described herein include a salt of an alkaline earth metal. Exemplary alkaline earth metals include, calcium, beryllium, magnesium, strontium, barium, and radium. In some embodiments, the alkaline earth metal is calcium or magnesium. Preferably, the alkaline earth metal is calcium.

Exemplary alkaline earth metal salts include, but are not limited to, calcium chloride, calcium citrate, calcium carbonate, calcium acetate, calcium gluconate, calcium lactate, calcium glubionate, calcium carbonate, calcium phosphate, calcium sulphate, calcium levulinate, calcium benzoate, calcium bromate, calcium bromide, calcium chlorate, calcium chromate, calcium dihydrogen phosphate, calcium dithionate, calcium formate, calcium glycerophosphate, calcium hydrogen sulfide, calcium iodide, calcium lactate, calcium metasilicate, calcium nitrate, calcium nitrite, calcium pantothenate, calcium perchlorate, calcium permanganate, calcium phosphinate, calcium salicylate, calcium succinate, or any combinations thereof. In some preferred embodiments, the alkaline earth metal salt is calcium chloride.

The amount of the alkaline earth metal salt used in the solvent can be from about 1× (mol/mol) or more of an amount of oxalic acid or oxalate in the chaga mushroom solid or the crude chaga mushroom extract. For example, the amount of the alkaline earth metal salt used in the solvent can be from about 5× (mol/mol) or more of an amount of oxalic acid or oxalate in the chaga mushroom solid or the crude chaga mushroom extract. In some embodiments, the amount of the alkaline earth metal salt used in the solvent is from about 5× (mol/mol) to about 150× (mol/mol) of an amount of oxalic acid or oxalate in the chaga mushroom solid or the crude chaga mushroom extract. For example, the amount of the alkaline earth metal salt used in the solvent is about 10× (mol/mol), or about 15× (mol/mol), 20× (mol/mol), or about 25× (mol/mol), 30× (mol/mol), or about 35× (mol/mol), 40× (mol/mol), or about 45× (mol/mol), 50× (mol/mol), or about 55× (mol/mol), 60× (mol/mol), or about 65× (mol/mol), 70× (mol/mol), or about 75× (mol/mol), 80× (mol/mol), or about 85× (mol/mol), 90× (mol/mol), or about 95× (mol/mol), 100× (mol/mol), or about 105× (mol/mol), 110× (mol/mol), or about 115× (mol/mol), 120× (mol/mol), or about 125× (mol/mol), 130× (mol/mol), or about 135× (mol/mol), 140× (mol/mol), or about 145× (mol/mol), or about 150× (mol/mol), or more of an amount of oxalic acid or oxalate in the chaga mushroom solid or the crude chaga mushroom extract.

It is noted that the method of preparing the chaga mushroom extract comprises use of an alkaline earth metal salt. Thus, the extract obtained by the method described herein can comprise some amount of the alkaline earth metal salt. The amount of the alkaline earth metal salt in the extract can be from about 0.001% to about 15%, or from about 0.001% to about 10%, or from about 0.001% to about 5%, or from about 0.001% to about 1% (w/w or w/v) of the extract.

As discussed above, the oxalic acid or oxalate free chaga mushroom extract described herein can be used as an additive to increase the antioxidant properties of food products. For example, the oxalic acid or oxalate free chaga mushroom extract described herein can be added to a food product. Thus, another aspect provided herein is a food product comprising a chaga mushroom extract described herein. For example, a food product comprising a chaga mushroom extract described herein and wherein the food product is substantially free of oxalic acid or oxalate.

The amount of the oxalic acid or oxalate free chaga mushroom extract in the food product can be any desired amount. For example, the amount of the oxalic acid or oxalate free chaga mushroom extract in the food product can be from about 0.01% to about 95% (w/w or w/v) of the food product. In some embodiments, the amount of the oxalic acid or oxalate free chaga mushroom extract in the food product can be from about 0.1% to about 85%, or from about 1% to about 80%, or from about 5% to about 75%, or from about 5% to about 50%, or from about 5% to about 25% (w/w or w/v) of the food product.

In some embodiments, the amount of the oxalic acid or oxalate free chaga mushroom extract in the food product is such that one serving of the food product provides about 30% of a person's daily antioxidant. FDA guidelines suggest about 8,000 to about 11,000 ORAC units/day. Thus, the amount of the oxalic acid or oxalate free chaga mushroom extract in the food product can be such that one serving of the food product provides about 2400 to about 3300 ORAC units per serving of the food product.

A food product of the disclosure is not limited to a particular form. For example, the food product can be a liquid, a solid or a semi-solid. Exemplary food products include, but are not limited to, beverages, dairy products, baked goods, confectionery and cereal products.

In addition to the extract, the food product can comprise at least one fluid. Exemplary fluids include, but are not limited to, water, juice, dairy milk, non-dairy milk, nut milk, rice milk, tea, coffee, and kava. Some exemplary specific food products include, but are not limited to, tea, coffee, soft drinks, juice drinks, smoothies, milk, yogurts, cheeses, nutritional supplements, dietary supplements, pre-mixed drinks, meal replacement products, snacks, trail mixes, energy bars, powders, cakes, cookies, crackers, breads, scones, muffins, custards, rice puddings, mousses, ice creams, sherbets, sorbets, and confectionery products.

In addition to the extract, a food product described herein can comprise one or more of flavorants and flavoring agents, sweeteners, antioxidants, flavonoids, astringent compounds, polyols, preservatives, colorants, proteins or protein hydrolysates, surfactants, emulsifiers, weighing agents, gums, alcohols, polymers and any combinations thereof.

In some embodiments, the food product further comprises a flavorant or flavoring agent. Exemplary flavorants or flavoring agents include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring agent" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include DÖHLER™ Natural Flavoring Sweetness Enhancer K14323 (DÖHLER™, Darmstadt, Germany), SYMRISE™ Natural Flavor Mask for Sweeteners 161453 and 164126 (SYMRISE™, Holzminden, Germany), NATURAL ADVANTAGE™ Bitterness Blockers 1, 2, 9 and 10 (NATURAL ADVANTAGE™, Freehold, N.J., U.S.A.), and SUCRAMASK™ (Creative Research Management, Stockton, Calif., U.S.A.).

When present, the flavorant or flavoring agent can be present in an amount from about 0.01% to about 50% (w/w or w/v) of the food product. For example, the flavorant or flavoring agent can be present in an amount from about 0.1% to about 25%, or from about 0.5% to about 20%, or from about 1% to about 15%, or from about 1.5% to about 10%, or from about 2.5% to about 7.5% (w/w or w/v) of the food product.

In some embodiments, the food product further comprises at least one sweetener. The sweetener can be any type of sweetener, for example, a natural, non-natural, or synthetic sweetener. For example, the sweetener can be a carbohydrate sweetener. Non-limiting examples of suitable carbohydrate sweeteners include sucrose, fructose, glucose, erythritol, maltitol, lactitol, sorbitol, mannitol, xylitol, tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof. D- or L-configurations can be used when applicable.

In some embodiments, the sweetener can be a natural high potency sweetener. Suitable natural high potency sweeteners include, but are not limited to, rebaudioside A, rebaudioside B, rebaudioside C, rebaudioside D, rebaudioside E, rebaudioside F, rebaudioside I, rebaudioside H, rebaudioside L, rebaudioside K, rebaudioside J, rebaudioside N, rebaudioside O, rebaudioside M, dulcoside A, dulcoside B, rubusoside, stevia, stevioside, mogroside IV, mogroside V, Luo Han Guo, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I. The natural high potency sweetener can be provided as a pure compound or, alternatively, as part of an extract.

In still other embodiments, the sweetener can be chemically or enzymatically modified natural high potency sweetener. Modified natural high potency sweeteners include glycosylated natural high potency sweetener such as glucosyl-, galactosyl-, fructosyl-derivatives containing 1-50 glycosidic residues. Glycosylated natural high potency sweeteners may be prepared by enzymatic transglycosylation reaction catalyzed by various enzymes possessing transglycosylating activity.

In yet other embodiments, the sweetener is a synthetic sweetener. As used herein, the phrase "synthetic sweetener" refers to any composition which is not found naturally in nature and characteristically has a sweetness potency greater than sucrose, fructose, or glucose, yet has less calories. Non-limiting examples of synthetic high-potency sweeteners include, but are not limited to, sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof.

When present, the sweetener can be present in an amount from about 0.01% to about 50% (w/w or w/v) of the food product. For example, the sweetener can be present in an amount from about 0.1% to about 25%, or from about 0.5% to about 20%, or from about 1% to about 15%, or from about 1.5% to about 10%, or from about 2.5% to about 7.5% (w/w or w/v) of the food product.

In some embodiments, the food product comprises an antioxidant agent. Exemplary antioxidant agents include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, and combinations thereof. In some embodiments, the antioxidant is vitamin A, vitamin C, vitamin E, ubiquinone, mineral selenium, manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone phytoestrogens, genistein, daidzein, glycitein, anythocyanins, cyaniding, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-α-lipoic acid, N-acetylcysteine, emblicanin, procyanidins, anthocyanins, reservatrol, isoflavones, punicalagin, ellagitannin, hesperidin, naringin, citrus flavonoids, chlorogenic acid, apple extract, apple skin extract (applephenon), rooibos extract red, rooibos extract, green, hawthorn berry extract, red raspberry extract, green coffee antioxidant (GCA), aronia extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. The antioxidant can be a synthetic antioxidant such as butylated hydroxytolune or butylated hydroxyanisole, for example.

When present, the antioxidant agent can be present in an amount from about 0.01% to about 50% (w/w or w/v) of the food product. For example, the antioxidant agent can be present in an amount from about 0.1% to about 25%, or from about 0.5% to about 20%, or from about 1% to about 15%, or from about 1.5% to about 10%, or from about 2.5% to about 7.5% (w/w or w/v) of the food product.

In some embodiments, the food product comprises a flavonoid. Suitable flavonoids are classified as flavonols, flavones, flavanones, flavan-3-ols, isoflavones, or anthocyanidins. Exemplary flavonoids include, but are not limited to, catechins (e.g., green tea extracts such as POLYPHENON™

60, POLYPHENON™ 30, and POLYPHENON™ 25 (Mitsui Norin Co., Ltd., Japan), polyphenols, rutins (e.g., enzyme modified rutin SANMELIN™ AO (San-fi Gen F.F.I., Inc., Osaka, Japan)), neohesperidin, naringin, neohesperidin dihydrochalcone, and the like.

When present, the flavonoid can be present in an amount from about 0.01% to about 50% (w/w or w/v) of the food product. For example, the flavonoid agent can be present in an amount from about 0.1% to about 25%, or from about 0.5% to about 20%, or from about 1% to about 15%, or from about 1.5% to about 10%, or from about 2.5% to about 7.5% (w/w or w/v) of the food product.

In some embodiments, the food product comprises an astringent compound. Exemplary astringent compounds include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols).

When present, the astringent compound can be present in an amount from about 0.01% to about 50% (w/w or w/v) of the food product. For example, the astringent compound can be present in an amount from about 0.1% to about 25%, or from about 0.5% to about 20%, or from about 1% to about 15%, or from about 1.5% to about 10%, or from about 2.5% to about 7.5% (w/w or w/v) of the food product.

In some embodiments, the food product comprises a polyol. Exemplary polyols include, but are not limited to, erythritol, maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols.

When present, the polyol can be present in an amount from about 0.01% to about 50% (w/w or w/v) of the food product. For example, the polyol can be present in an amount from about 0.1% to about 25%, or from about 0.5% to about 20%, or from about 1% to about 15%, or from about 1.5% to about 10%, or from about 2.5% to about 7.5% (w/w or w/v) of the food product.

In some embodiments, the food product comprises a preservative. When present, the preservative can be chosen from antimicrobials, antioxidants, antienzymatics or combinations thereof. Non-limiting examples of preservatives include, but are not limited to, sulfites, propionates, benzoates, sorbates, nitrates, nitrites, bacteriocins, salts, and sugars. Exemplary specific preservatives include, but are not limited to, acetic acid, dimethyl dicarbonate (DMDC), sulfur dioxide, sodium bisulfite, potassium hydrogen sulfite, propionic acid, calcium propionate, sodium propionate, sodium benzoate benzoic acid, potassium sorbate, sodium sorbate, calcium sorbate, sorbic acid, sodium nitrate, sodium nitrite, nisin, ethanol, ozone, ascorbic acid, citric acid, and metal chelating agents such as ethylenediaminetetraacetic acid (EDTA).

When present, the preservative can be present in an amount from about 0.01% to about 50% (w/w or w/v) of the food product. For example, the preservative can be present in an amount from about 0.1% to about 25%, or from about 0.5% to about 20%, or from about 1% to about 15%, or from about 1.5% to about 10%, or from about 2.5% to about 7.5% (w/w or w/v) of the food product.

The food product can also contain one or more functional ingredients, which provide a real or perceived heath benefit to the food product. Functional ingredients include, but are not limited to, antioxidants, dietary fiber sources, fatty acids, vitamins, saponins, glucosamine, minerals, preservatives, hydration agents, probiotics, prebiotics, phytoestrogens, phytosterols and combinations thereof.

In some embodiments, the food product comprises at least one dietary fiber source. Generally, the at least one dietary fiber source is present in the food product in a concentration sufficient to promote health and wellness. For example, the dietary fiber source can be present in an amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. Numerous polymeric carbohydrates having significantly different structures in both composition and linkages fall within the definition of dietary fiber. Such compounds are well known to those skilled in the art, non-limiting examples of which include non-starch polysaccharides, lignin, cellulose, methylcellulose, the hemicelluloses, β-glucans, pectins, gums, mucilage, waxes, inulins, oligosaccharides, fructooligosaccharides, cyclodextrins, chitins, and combinations thereof.

In some embodiments, the food product comprises at least one fatty acid. Generally, the at least one fatty acid is present in the food product in a concentration sufficient to promote health and wellness. For example, the fatty acid can be present in an amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. As used herein, "fatty acid" refers to any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. Exemplary fatty acids include, but are not limited to, omega-3 fatty acids and omega-6 fatty acids.

In some embodiments, the food product comprises at least one vitamin. Generally, the at least one vitamin is present in the food product in a concentration sufficient to promote health and wellness. For example, the vitamins can be present in a total amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. Exemplary vitamins include, but are not limited to, vitamin A, vitamin D, vitamin E, vitamin K, vitamin B1, vitamin B2, vitamin B3, vitamin B5, vitamin B6, vitamin B7, vitamin B9, vitamin B12, and vitamin C. Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methylmethionine. As used herein, the term vitamin includes pseudo-vitamins.

In some embodiments, the food product comprises at least one saponin. Generally, the at least one saponin is present in the food product in a concentration sufficient to promote health and wellness. For example, the saponin can be present in an amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product.

In some embodiments, the food product comprises glucosamine. Generally, the glucosamine is present in the food product in a concentration sufficient to promote health and wellness. For example, the glucosamine can be present in an amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. Glucosamine, also called chitosamine, is an amino sugar that is believed to be an important precursor in the biochemical synthesis of glycosylated proteins and lipids. D-glucosamine occurs naturally in the cartilage in the form of glucosamine-6-phosphate, which is synthesized from fructose-6-phosphate and glutamine. However, glucosamine also is available in other forms, non-limiting examples of which include glucosamine hydrochloride, glucosamine sulfate, N-acetyl-glucosamine, or any other salt forms or combinations thereof. Glucosamine may be obtained by acid hydrolysis of the shells of lobsters, crabs, shrimps, or prawns using methods well known to those of ordinary skill in the art. In some embodiments, the food product comprises chondroitin sulfate.

In some embodiments, the food product comprises at least one mineral. Generally, the at least one mineral is present in the food product in a concentration sufficient to promote health and wellness. For example, the minerals can be present in a total amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. Exemplary minerals include, but are not limited to, bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, jodine, bismuth, boron, lithium, nickel, rubidium, silicon, strontium, tellurium, tin, titanium, tungsten, and vanadium.

In some embodiments, the food product comprises at least one hydration agent. Generally, the at least one hydration agent is present in the food product in a concentration sufficient to promote health and wellness. For example, the hydration agent can be present in an amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. In some embodiments, the hydration agent is a composition that helps the body replace fluids that are lost during exercise. Accordingly, in a particular embodiment, the hydration agent is an electrolyte, non-limiting examples of which include sodium, potassium, calcium, magnesium, chloride, phosphate, bicarbonate, and combinations thereof. Suitable electrolytes for use in food products are also described in U.S. Pat. No. 5,681,569, the content of which is incorporated herein by reference in its entirety. Electrolytes can be obtained from their corresponding water-soluble salts. Non-limiting examples of water soluble salts include chlorides, carbonates, sulfates, acetates, bicarbonates, citrates, phosphates, hydrogen phosphates, tartates, sorbates, citrates, benzoates, or combinations thereof.

In some embodiments, the hydration agent is a carbohydrate to supplement energy stores burned by muscles. Suitable carbohydrates for use in particular embodiments of this invention are described in U.S. Pat. Nos. 4,312,856, 4,853,237, 5,681,569, and 6,989,171, the contents of all which are incorporated herein by reference in their entirety. Non-limiting examples of suitable carbohydrates include monosaccharides, disaccharides, oligosaccharides, complex polysaccharides or combinations thereof. Non-limiting examples of suitable types of monosaccharides include trioses, tetroses, pentoses, hexoses, heptoses, octoses, and nonoses. Non-limiting examples of specific types of suitable monosaccharides include glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, and sialose. Non-limiting examples of suitable disaccharides include sucrose, lactose, and maltose. Non-limiting examples of suitable oligosaccharides include saccharose, maltotriose, and maltodextrin.

In some embodiments, the hydration agent is a flavanol that provides cellular rehydration. Non-limiting examples of suitable flavanols include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof.

In some embodiments, the hydration agent is a glycerol solution to enhance exercise endurance. The ingestion of a glycerol containing solution has been shown to provide beneficial physiological effects, such as expanded blood volume, lower heart rate, and lower rectal temperature.

In some embodiments, the food product comprises at least one probiotic, prebiotic and combination thereof. Generally, the at least one probiotic, prebiotic or combination thereof is present in the food product in a concentration sufficient to promote health and wellness. For example, the probiotic or prebiotic can be present in an amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. Probiotics comprise microorganisms that benefit health when consumed in an effective amount. Desirably, probiotics beneficially affect the human body's naturally-occurring gastrointestinal microflora and impart health benefits apart from nutrition. Probiotics can include, without limitation, bacteria, yeasts, and fungi. Examples of probiotics include, but are not limited to, bacteria of the genus *Lactobacilli*, *Bifidobacteria*, *Streptococci*, or combinations thereof, that confer beneficial effects to humans. Non-limiting examples of probiotics include *L. acidophilus*, *L. casei*, *L. fermentum*, *L. saliva roes*, *L. brevis*, *L. leichmannii*, *L. plantarum*, *L. cellobiosus*, *L. reuteri*, *L. rhamnosus*, *L. GG*, *L. bulgaricus*, *L. thermophiles*, *B. angulatum*, *B. animalis*, *B. asteroides*, *B. bifidum*, *B. bourn*, *B. breve*, *B. catenalatum*, *B. choerinum*, *B. coryneforme*, *B. cuniculi*, *B. dentium*, *B. gallicum*, *B. gallinarum*, *B indicum*, *B. longum*, *B. magnum*, *B. merycicum*, *B. minimum*, *B. pseudocatenulatum*, *B. pseudolongum*, *B. psychraerophilum*, *B. pullorum*, *B. ruminantium*, *B. saeculare*, *B. scardovii*, *B. simiae*, *B. subtile*, *B. thermacidophilum*, *B. thermophilum*, *B. urinalis*, *S. salivarus* and *S. cremoris*. Prebiotics include, without limitation, mucopolysaccharides, oligosaccharides, polysaccharides, amino acids, vitamins, nutrient precursors, proteins and combinations thereof.

In some embodiments, the food product comprises at least one phytoestrogen. Generally, the at least one phytoestrogen is present in the food products in a concentration sufficient to promote health and wellness. For example, the phytoestrogen can be present in an amount from about 0.01% to about 50%, or from about 0.1% to about 25%, or from about 0.5% to about 20%, or from about 1% to about 15%, or from about 1.5% to about 10%, or from about 2.5% to about 7.5%

(w/w or w/v) of the food product. Phytoestrogens are compounds found in plants which can typically be delivered into human bodies by ingestion of the plants or the plant parts having the phytoestrogens. As used herein. "phytoestrogen" refers to any substance which, when introduced into a body causes an estrogen-like effect of any degree. For example, a phytoestrogen may bind to estrogen receptors within the body and have a small estrogen-like effect. Examples of suitable phytoestrogens include, but are not limited to, isoflavones, stilbenes, lignans, resorcyclic acid lactones, coumestans, coumestrol, equol, and combinations thereof.

In some embodiments, the food product comprises at least one phytosterol, phytostanol or combination thereof. Generally, the at least one phytosterol, phytostanol or combination thereof is present in the food product in a concentration sufficient to promote health and wellness. For example, the phytosterol or phytostanol can be present in an amount from about 0.01% to about 50%, or from about 0.1% to about 25%, or from about 0.5% to about 20%, or from about 1% to about 15%, or from about 1.5% to about 10%, or from about 2.5% to about 7.5% (w/w or w/v) of the food product. Exemplary phytosterols include, but are not limited to, 4-desmethylsterols (e.g., β-sitosterol, campesterol, stigmasterol, brassicasterol, 22-dehydrobrassicasterol, and Δ5-avenasterol), 4-monomethyl sterols, and 4,4-dimethyl sterols (triterpene alcohols) (e.g., cycloartenol, 24-methylenecycloartanol, and cyclobranol). Exemplary phytostanols include, but are not limited to, β-sitostanol, campestanol, cycloartanol, and saturated forms of other triterpene alcohols. Non-limiting examples of suitable phytosterol and phytostanol esters include sitosterol acetate, sitosterol oleate, stigmasterol oleate, and their corresponding phytostanol esters.

Some exemplary embodiments of the various aspects described herein can be described by the following numbered embodiments:

Embodiment 1: A food product comprising an *Inonotus obliquus* (chaga mushroom) extract, and wherein the food product is substantially free of oxalic acid or oxalate.

Embodiment 2: The food product of Embodiment 1, wherein the food product further comprises a salt of an alkaline earth metal.

Embodiment 3: The food product of Embodiment 2, wherein the alkaline earth metal is calcium.

Embodiment 4: The food product of any one of Embodiments 2-3, wherein the salt is selected from the group consisting calcium chloride, calcium citrate, calcium carbonate, calcium acetate, calcium gluconate, calcium lactate, calcium glubionate, calcium carbonate, calcium phosphate, calcium sulphate, calcium levulinate, calcium benzoate, calcium bromate, calcium bromide, calcium chlorate, calcium chromate, calcium dihydrogen phosphate, calcium dithionate, calcium formate, calcium glycerophosphate, calcium hydrogen sulfide, calcium iodide, calcium lactate, calcium metasilicate, calcium nitrate, calcium nitrite, calcium pantothenate, calcium perchlorate, calcium permanganate, calcium phosphinate, calcium salicylate, calcium succinate, and any combinations thereof.

Embodiment 5: The food product of any one of Embodiments 2-4, wherein the salt is calcium chloride.

Embodiment 6: The food product of any one of Embodiments 1-5, wherein the food product comprises the chaga mushroom extract in an amount from about 5% to about 75% (w/w, w/v or v/v) of the food product.

Embodiment 7: The food product of any one of Embodiments 1-6, wherein the food product is a liquid, a solid or a semi-solid.

Embodiment 8: The food product of any one of Embodiments 1-7, wherein the food product is selected from the group consisting of beverages, dairy products, baked goods, confectionery and cereal products.

Embodiment 9: The food product of any one of Embodiments 1-8, wherein the food product is tea, coffee, soft drink, juice drink, smoothie, milk, yogurt, cheese, nutritional supplement, dietary supplement, pre-mixed drink, meal replacement product, snack, trail mix, energy bar, powder, cake, cookie, cracker, bread, scone, muffin, custard, rice pudding, mousse, ice cream, sherbet, sorbet or confectionary product.

Embodiment 10: The food product of any one of Embodiments 1-9, wherein the food product comprises at least one fluid.

Embodiment 11: The food product of Embodiment 10, wherein the fluid is water, juice, dairy milk, non-dairy milk, nut milk, rice milk, tea, coffee, and kava.

Embodiment 12: The food product of any one of Embodiments 1-11, wherein the food product further comprises an ingredient selected from the group consisting of flavorants and flavoring agents, sweeteners, antioxidants, flavonoids, astringent compounds, polyols, preservatives, colorants, proteins or protein hydrolysates, surfactants, emulsifiers, weighing agents, gums, alcohols, polymers, dietary fiber sources, fatty acids, vitamins, saponins, glucosamine, minerals, preservatives, hydration agents, probiotics, prebiotics, phytoestrogens, phytosterols, and any combinations thereof.

Embodiment 13: A method for preparing an *Inonotus obluquus* (chaga mushroom) extract, the method comprising: (a) extracting a chaga mushroom solid with a first solvent; (b) separating the solvent extract; (c) removing the first solvent from the solvent extract to obtain a crude chaga mushroom extract; (d) extracting the crude chaga mushroom extract with a second solvent; and (e) adding a salt of an alkaline earth metal to the solvent extract, to obtain a chaga mushroom extract, and wherein the chaga mushroom extract is substantially free of oxalic acid or oxalate.

Embodiment 14: The method of Embodiment 13, further comprising a step of separating the solvent extract prior to adding the salt of an alkaline earth metal.

Embodiment 15: The method of Embodiment 13, further comprising a step separating the solvent extract after adding the salt of an alkaline earth metal.

Embodiment 16: The method of any one of Embodiments 13-15, further comprising a removing the second solvent form the solvent extract after adding the salt of an alkaline earth metal.

Embodiment 17: A method for preparing an *Inonotus obluquus* (chaga mushroom) extract, the method comprising: (a) extracting a chaga mushroom solid with a first solvent; (b) separating the solvent extract; (c) removing the first solvent from the solvent extract to obtain a crude chaga mushroom extract; (d) extracting the crude chaga mushroom extract with a second solvent (e.g., water) comprising a salt of an alkaline earth metal; and (e) separating the solvent extract to obtain a chaga mushroom extract, and wherein the chaga mushroom extract is substantially free of oxalic acid or oxalate.

Embodiment 18: The method of Embodiment 17, further comprising removing the second solvent from the solvent extract.

Embodiment 19: The method of any one of Embodiments 13-18, wherein the first and/or second solvent is a mixture of two or more solvents.

Embodiment 20: The method of any one of Embodiments 13-19, wherein the first solvent comprises an alcohol.

Embodiment 21: The method of Embodiment 20, wherein the alcohol is ethanol.

Embodiment 22: The method of any one of Embodiments 13-21, wherein said extracting from the chaga mushroom solid with the first solvent is at an elevated temperature.

Embodiment 23: The method of any one of Embodiments 13-22, wherein said extracting from the chaga mushroom solid with the first solvent is at a temperature from about 50° C. to about 90° C.

Embodiment 24: The method of any one of Embodiments 13-21, wherein said extracting from the chaga mushroom solid with the first solvent is at room temperature.

Embodiment 25: The method of any one of Embodiments 13-21, wherein said extracting from the chaga mushroom solid with the first solvent is at a temperature from about 15° C. to about 30° C.

Embodiment 26: The method of any one of Embodiments 13-25, wherein the chaga mushroom solid is a powder.

Embodiment 27: The method of any one of Embodiments 13-26, wherein the crude chaga mushroom extract is a solid.

Embodiment 28: The method of any one of Embodiments 13-27, wherein the crude chaga mushroom extract is a liquid.

Embodiment 29: The method of any one of Embodiments 13-28, wherein the second solvent is water.

Embodiment 30: The method of any one of Embodiments 13-29, wherein said extracting from the crude chaga mushroom extract with the second solvent is at an elevated temperature.

Embodiment 31: The method of any one of Embodiments 13-30, wherein said extracting from the crude chaga mushroom extract with the second solvent is at a temperature from about 50° C. to about 90° C.

Embodiment 32: The method of any one of Embodiments 13-29, wherein said extracting from the crude chaga mushroom extract with the second solvent is at room temperature.

Embodiment 33: The method of any one of Embodiments 13-29, wherein said extracting from the crude chaga mushroom extract with the second solvent is at a temperature from about 15° C. to about 30° C.

Embodiment 34: The method of any one of Embodiments 13-33, wherein second solvent comprises the salt in an amount 10× (mol/mol) or more of an amount of oxalic acid or oxalate in the chaga mushroom solid.

Embodiment 35: The method of any one of Embodiments 13-34, wherein second solvent comprises the salt in an amount 50× or more of an amount of oxalic acid or oxalate in the chaga mushroom solid.

Embodiment 36: The method of any one of Embodiments 13-35, wherein second solvent comprises the salt in an amount 100× or more of an amount of oxalic acid or oxalate in the chaga mushroom solid.

Embodiment 37: A method for preparing an *Inonotus obluquus* (chaga mushroom) extract, the method comprising: (a) extracting a chaga mushroom solid with a solvent; (b) adding a salt of an alkaline earth metal to the solvent extract to obtain a chaga mushroom extract, and wherein the chaga mushroom extract is substantially free of oxalic acid or oxalate.

Embodiment 38: The method of Embodiment 37, further comprising a step of separating the solvent extract prior to adding the salt of an alkaline earth metal.

Embodiment 39: The method of Embodiment 37, further comprising a step of separating the solvent extract after adding the salt of an alkaline earth metal.

Embodiment 40: The method of any one of Embodiments 37-39, further comprising a removing the solvent form the solvent extract after adding the salt of an alkaline earth metal.

Embodiment 41: A method for preparing an *Inonotus obluquus* (chaga mushroom) extract, the method comprising: (a) extracting a chaga mushroom solid with a solvent comprising a salt of an alkaline earth metal; (b) separating the solvent extract; and (c) removing the solvent from the solvent extract to obtain a chaga mushroom extract, and wherein the chaga mushroom extract is substantially free of oxalic acid or oxalate.

Embodiment 42: The method of any one of Embodiments 37-41, wherein solvent is a mixture of two or more solvents.

Embodiment 43: The method of any one of Embodiments 37-42, wherein the solvent comprises water.

Embodiment 44: The method of any one of Embodiments 37-43, wherein said extracting from the chaga mushroom solid with the solvent is at an elevated temperature.

Embodiment 45: The method of any one of Embodiments 37-44, wherein said extracting from the chaga mushroom solid with the solvent is at a temperature from about 50° C. to about 90° C.

Embodiment 46: The method of any one of Embodiments 37-45, wherein solvent comprises the salt in an amount 10× (mol/mol) or more of an amount of oxalic acid or oxalate in the chaga mushroom solid.

Embodiment 47: The method of any one of Embodiments 37-46, wherein solvent comprises the salt in an amount 50× or more of an amount of oxalic acid or oxalate in the chaga mushroom solid.

Embodiment 48: The method of any one of Embodiments 37-47, wherein solvent comprises the salt in an amount 100× or more of an amount of oxalic acid or oxalate in the chaga mushroom solid.

Embodiment 49: The method of any one of Embodiments 13-48, wherein the alkaline earth metal is calcium.

Embodiment 50: The method of any one of Embodiments 13-49, wherein the salt is selected from the group consisting calcium chloride, calcium citrate, calcium carbonate, calcium acetate, calcium gluconate, calcium lactate, calcium glubionate, calcium carbonate, calcium phosphate, calcium sulphate, calcium levulinate, calcium benzoate, calcium bromate, calcium bromide, calcium chlorate, calcium chromate, calcium dihydrogen phosphate, calcium dithionate, calcium formate, calcium glycerophosphate, calcium hydrogen sulfide, calcium iodide, calcium lactate, calcium metasilicate, calcium nitrate, calcium nitrite, calcium pantothenate, calcium perchlorate, calcium permanganate, calcium phosphinate, calcium salicylate, calcium succinate, and any combinations thereof.

Embodiment 51: The method of any one of Embodiments 13-50, wherein the salt is calcium chloride.

Embodiment 52: The method of any one of Embodiments 13-51, further comprising a step introducing the chaga mushroom extract into a liquid, a solid, or a semi-solid to form a food product.

Embodiment 53: A chaga mushroom extract prepared using a method of any one of Embodiments 13-51.

Embodiment 54: A food product comprising a chaga mushroom extract prepared using a method of any one of Embodiments 13-51.

Embodiment 55: A chaga mushroom extract, wherein the chaga mushroom extract tea is free of oxalic acid or oxalate, and wherein, optionally, the chaga mushroom extract comprises a salt of an alkaline earth metal.

Embodiment 56: A method of increasing antioxidant activity of a food product, the method comprising adding an extract according to Embodiment 53 or 55 to the food product.

Some Selected Definitions

For convenience, the meaning of some terms and phrases used in the specification, examples, and appended claims, are provided below. Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments of the aspects provided herein, and are not intended to limit the claimed invention, because the scope of the invention is limited only by the claims. Further, unless otherwise required by context, singular terms shall include pluralities and plural terms shall include the singular.

As used herein the term "comprising" or "comprises" is used in reference to compositions, methods, and respective component(s) thereof, that are essential to the method or composition, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The singular terms "a," "an," and "the" include plural referents unless context clearly indicates otherwise. Similarly, the word "or" is intended to include "and" unless the context clearly indicates otherwise. Although methods and materials similar or equivalent to those provided herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Other than in the operating examples, or where otherwise indicated, all numbers expressing quantities of ingredients or reaction conditions used herein should be understood as modified in all instances by the term "about." The term "about" when used in connection with percentages can mean ±5% (e.g., ±4%, ±3%, ±2%, ±1%) of the value being referred to.

Where a range of values is provided, each numerical value between the upper and lower limits of the range is contemplated and disclosed herein.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow. Further, to the extent not already indicated, it will be understood by those of ordinary skill in the art that any one of the various embodiments herein described and illustrated can be further modified to incorporate features shown in any of the other embodiments disclosed herein.

The description of embodiments of the disclosure is not intended to be exhaustive or to limit the disclosure to the precise form disclosed. While specific embodiments of, and examples for, the disclosure are disclosed herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments disclosed herein can be combined to provide further embodiments. Aspects of the disclosure can be modified, if necessary, to employ the compositions, functions and concepts of the above references and application to provide yet further embodiments of the disclosure.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples in no way should be construed as being further limiting.

EXAMPLES

Example 1: Removing Oxalate From *Inonotus obliquus* (Chaga) Mushroom

Oxalate concentration in Chaga Mushroom extract and tea is very high (>25 ppm in tea). There are several literature and medical reports discussing the onset of kidney stones and kidney failure from the over consumption of chaga mushroom tea and chaga mushroom extract. All of these reports state that oxalate (oxalic acid) is responsible for the onset of onset of kidney stones and kidney failure.

Inventors have developed inter alia methods for removing oxalate from chaga mushroom extract through the fortification of other minerals e.g., calcium chloride. Exemplary methods are described below.

Exemplary Extraction Method

Add 10 g of Chaga (finely ground in coffee grinder) to 1.5 L beaker for sonication. Add 300 mL of Type 1 (nanopure) water and 300 mL of 200 proof ethanol. Sonicate using a sonics vcx 500 sonicator with 1 inch horn at 100% amplitude for 60 minutes (do not allow sample to go above 80 C). Filter sample in 1 L culture flask. Rotovap solvent and dissolve sample in methanol. Transfer to genevac and remove entire solvent. Dissolve sample in 40 mL of 1:1 type 1 water:200 proof ethanol and store at 4° C. until analysis.

Chaga Mushroom Brewing Procedure

The above described extraction method was scaled linearly to 100 g and used directly to prepare 6,000 mL of crude chaga mushroom extract. The crude extract was filtered to remove the insoluble plant material, and the filtered solvent was removed under reduced pressure to provide dried chaga mushroom extract. 50 mL of the filtered solvent was kept as a stock solution to work with. The dried chaga mushroom extract was dissolved in 1,500 mL of water and used directly.

Removal of Oxalate From Rehydrated Crude Chaga Mushroom Extract

The oxalate concentration in the CM extracts were determined via HPLC with an 8-point standard curve. 5 mL of each CM extract titrated in triplicate with a 5×, 10× and 100× molar ratio of calcium chloride ($CaCl_2$—CAS #7440-70-2) under vigorous stirring and filtered with a 0.22 μm PTFE syringe filter prior to analysis. The calcium chloride quenching solution did not exceed more than 0.5% of the total CM extract volume to avoid dilution errors. The samples were reanalyzed via HPLC to determine oxalate content.

Determining the Oxalate Concentration in Raw Chaga Mushroom Extracts

Both the raw and rehydrated extracts were diluted 2-fold in MeCN and analyzed by High Performance Liquid Chromatography (HPLC) directly without further workup or sample preparation.

HPLC Method and Sample Preparation

500 μL of room temperature CM brew was diluted with 500 μL of acetonitrile. Samples were vortexed for 15 s and analyzed immediately. An Agilent 1260 Infinity II HPLC system equipped with a quaternary pump, autosampler, thermostat, and diode array detector. Data processing and analysis was performed in MASSHUNTER® TOF suite.

Oxalate was separated on an Agilent Poroshell HILIC analytical column 3.0×150 mm with 2.7 μm particles, maintained at 35° C. The optimized mobile phase consisted of 30% 30 mM $Na_2HPO_4$ at pH 6.75 and 70% MeCN. Isocratic elution was employed over a 6 minute at a flowrate of 1.000 mL/min. The total run time was 6 minutes. The injection volume was 12 μL, and the selected ultraviolet (UV) detection wavelength was 214 nm at a bandwidth of 4.0, no reference wavelength, and an acquisition rate of 20 Hz.

Figure 1B:
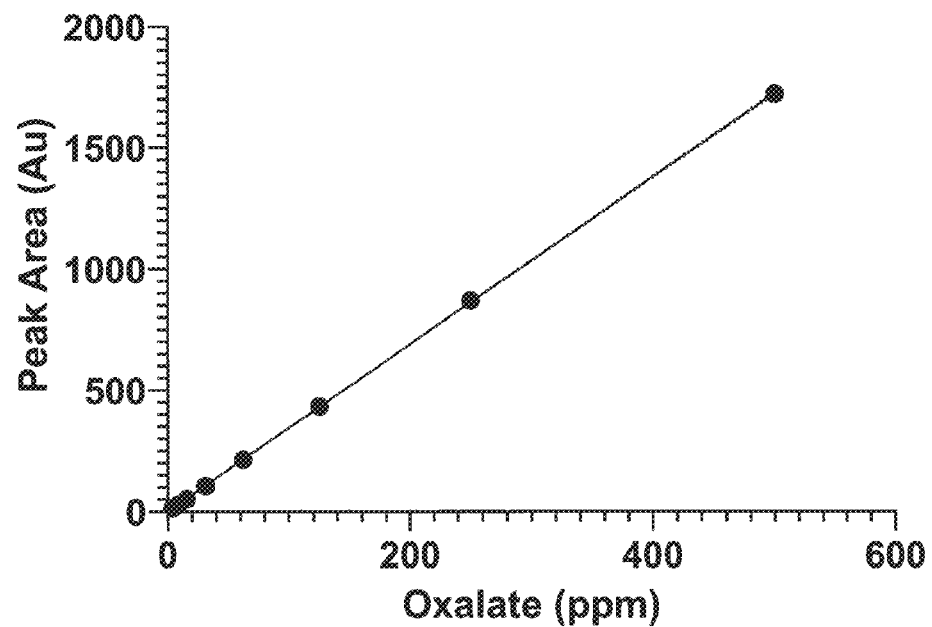

Results of HPLC method validation are shown in FIGS. 1A and 1B. HPLC linear dynamic range was 2-500 ppm (ug/mL). The LCMS linear dynamic range was 350-30,000 ppb (ng/ml).

Removing Oxalate From Chaga Mushroom Extract

Without wishing to be bound by a theory, oxalate (oxalic acid) acts as a bi-dentate ligand and binds calcium to form calcium oxalate precipitate, which is an irreversible process under standard conditions. This precipitate is removed from solution via filtration and the resulting solution is substantially free oxalic acid or oxalate. Calcium is charged into the chaga mushroom extract as calcium chloride, which has a total daily allowable intake of 2-2.5 g/day. Overdosing on calcium chloride is difficult.

Calcium chloride can be replaced with Calcium: citrate, carbonate, acetate, gluconate, lactate, glubionate, etc. Process also works with other group 2 metals such as magnesium and barium.

Figure 2A:
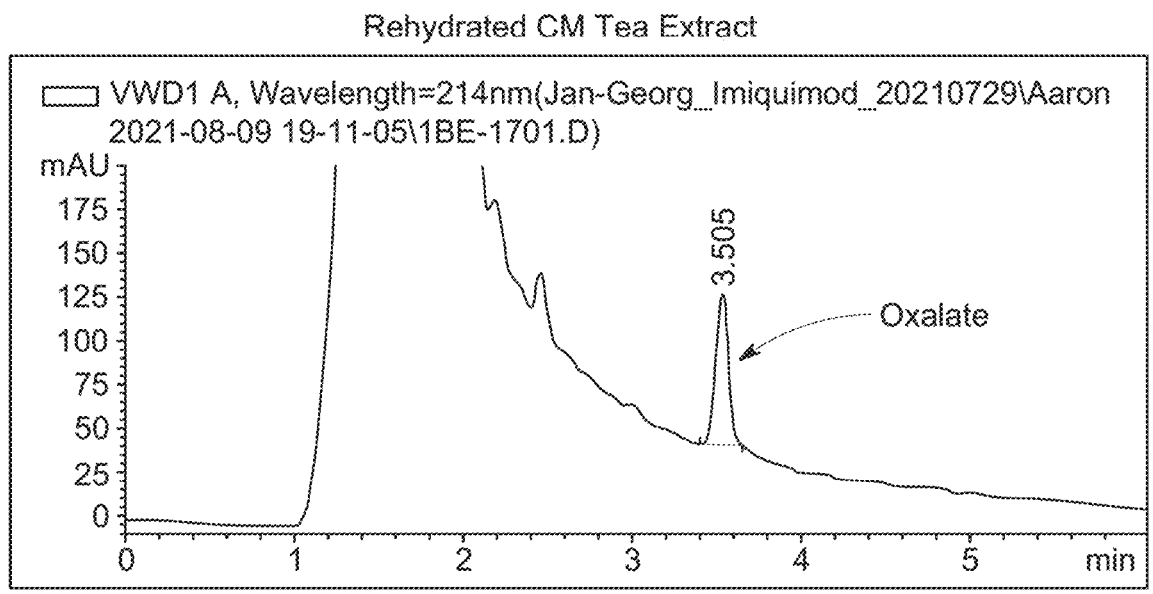
FIGS. 2A and 2B show chromatograms of rehydrated (FIG. 2A) and raw filtered (FIG. 2B) CM tea extracts.
Figure 2B:
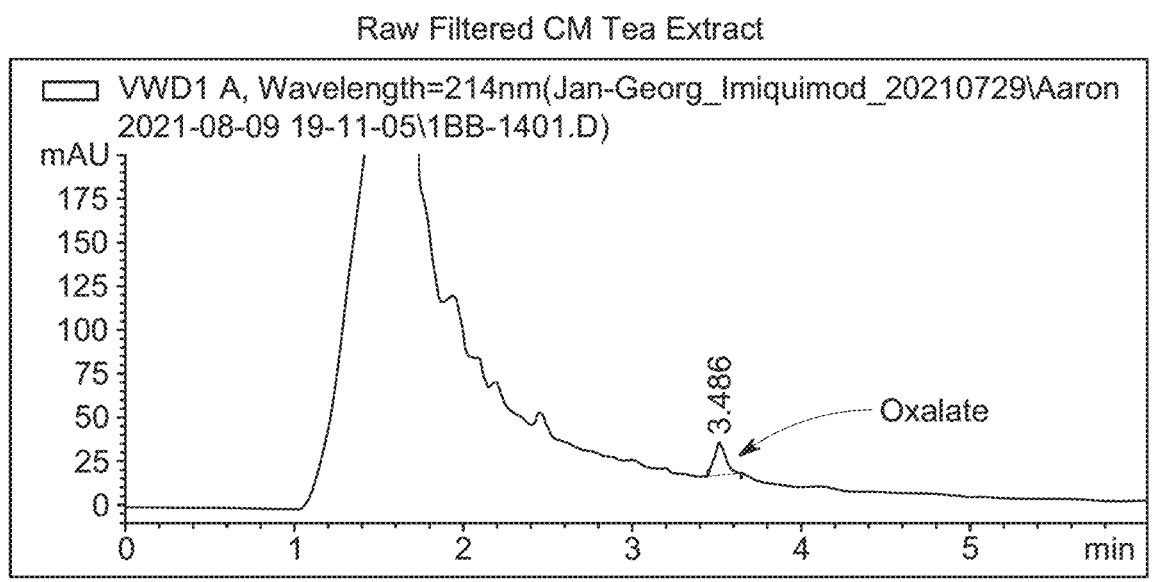

Exemplary oxalate concentration of rehydrated and raw chaga mushroom extracts prior to oxalate removal are shown in FIGS. 2A and B and summarized in Table 1.

TABLE 1

Oxalate Concentration of Rehydrated and Raw CM Extract (pre oxalate removal)

| Name | Oxalate Area | [Oxalate] ppm | [Oxalate] avg ppm | Standard Deviation (ppm) |
|---|---|---|---|---|
| Raw - 1 | 190.2 | 55.2 | 53.3 | 2.4 |
| Raw - 2 | 186.0 | 54.0 | | |
| Raw - 3 | 174.0 | 50.5 | | |
| Rehydrated - 1 | 844.0 | 244.8 | 246.6 | 4.0 |
| Rehydrated - 2 | 866.4 | 251.3 | | |
| Rehydrated - 3 | 840.8 | 243.8 | | |

As can be seen from the data summarized in Table 1, rehydrated extract is ~4× more concentrated, which agrees with the concentration method. Further, the method separates oxalate from the chaga mushroom extract with high specificity and selectivity in less than 6 minutes with excellent standard deviation and method robustness.

Figure 3:
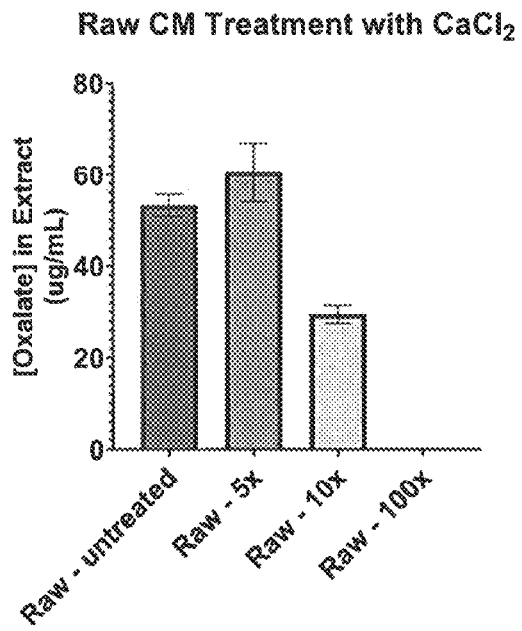
FIGS. 3 and 4 are show oxalate concentration of raw CM extract (FIG. 3) and rehydrated CM extract after treatment with calcium chloride at 5×, 10×, and 100× molar equivalents of oxalate.

Results of oxalate concentration of raw chaga mushroom extract after treatment with calcium chloride at 5×, 10×, and 100× molar equivalents of oxalate are shown in FIG. 3 and summarized in Table 2.

TABLE 2

Oxalate Concentration of Raw CM Extract After Oxalate Removal

| Name | Average Oxalate Area | [Oxalate] avg ppm | Standard Deviation (ppm) |
|---|---|---|---|
| Raw - Average | 190.2 | 53.3 | 2.4 |
| Raw - 5x | 208 | 60.5 | 6.5 |
| Raw - 10x | 100.4 | 29.4 | 2.0 |
| Raw - 100x | Not Detected | Not Detected | Not Detected |

All samples in replicates of 5 (n = 5)

As can be seen from the data summarized in Table 2, HPLC results suggest ~250 μg of oxalate in 5 mL of raw CM extract. Results show that the raw chaga mushroom extract treated with 5 eqiv. of $CaCl_2$ showed no decrease in oxalate concentration, raw chaga mushroom extract treated with 10 eqiv. of $CaCl_2$ showed a 50% decrease in oxalate concentration, and raw chaga mushroom extract treated with 100 eqiv. of $CaCl_2$ showed a >99% decrease in oxalate concentration (not detectable by HPLC).

Figure 4:
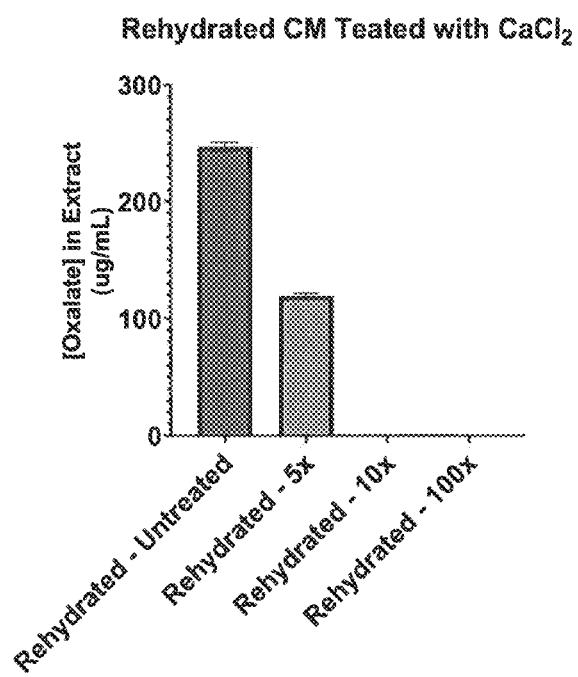

Results of oxalate concentration of rehydrated chaga mushroom extract after treatment with calcium chloride at 5×, 10×, and 100× molar equivalents of oxalate are shown in FIG. 4 and summarized in Table 3.

TABLE 3

Oxalate Concentration of Rehydrated CM Extract After Oxalate Removal

| Name | Average Oxalate Area | [Oxalate] avg ppm | Standard Deviation (ppm) |
|---|---|---|---|
| Rehydrated - Average | 850 | 247 | 4.0 |
| Rehydrated - 5x | 411 | 119 | 2.6 |
| Rehydrated - 10x | Not Detected | Not Detected | Not Detected |
| Rehydrated - 100x | Not Detected | Not Detected | Not Detected |

As can be seen from the data summarized in Table 3, the rehydrated chaga extract treated with 5 eqiv. of $CaCl_2$ showed a 50% decrease in oxalate concentration, rehydrated chaga mushroom extract treated with 10 eqiv. of $CaCl_2$ showed a >99% decrease in oxalate concentration (not detectable by HPLC), and rehydrated chaga mushroom extract treated with 100 eqiv. of $CaCl_2$ showed a >99% decrease in oxalate concentration (not detectable by HPLC).

The work presented herein show that the process is scalable and linear, and calcium chloride can be used to fully remove oxalate from chaga mushroom extract to provide a chaga mushroom extract that is substantially free or generally bereft of (not detectable by HPLC) of oxalate. Rehydrated chaga mushroom extract in 100% water can be completely stripped of oxalate by HPLC with 10 molar equivalents of calcium chloride and 100 molar equivalents of calcium chloride is required to fully remove oxalate from raw chaga mushroom extract containing ethanol.

Oxygen Radical Absorbance Capacity (ORAC Assay) Methodology

All extraction samples were diluted 3750-fold in 10 mM PBS at pH 7.4. A 100 uM stock of Trolox was prepared in 10 mM PBS at pH 7.4 and subsequently diluted to create a series of standard calibrations: 0 uM, 6.25 uM, 12.5 uM, 25 uM, 50 uM, and 100 uM. 25 uL of each diluted extraction sample or standard was added to a black grenier 96-well plate. 150 uL of 4 nM fluorescein (made fresh daily) was added to each well. The outer edges of the well plate were not used for quantitation. The plate was incubated at 37 C for 30 minutes, and 25 uL of AAPH was added to each well. Fluorescein degradation was monitored at an excitation wavelength of 485 nm and emission wavelength of 528 nm on a BioTek Plate Reader every 60 seconds for 90 minutes. The kinetic curves for each sample were integrated against the blank to generate a calibration curve used to determine the oxygen radical absorbance capacity as uM Trolox equivalents per 100 g.

Figure 5A:
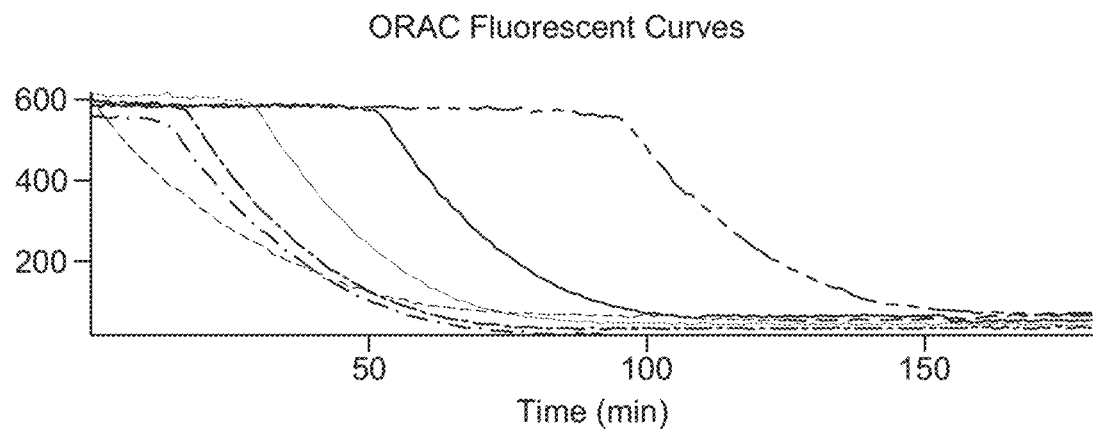
FIGS. 5A and 5B show Oxygen Radical Absorbance Capacity (ORAC) results.
Figure 5B:
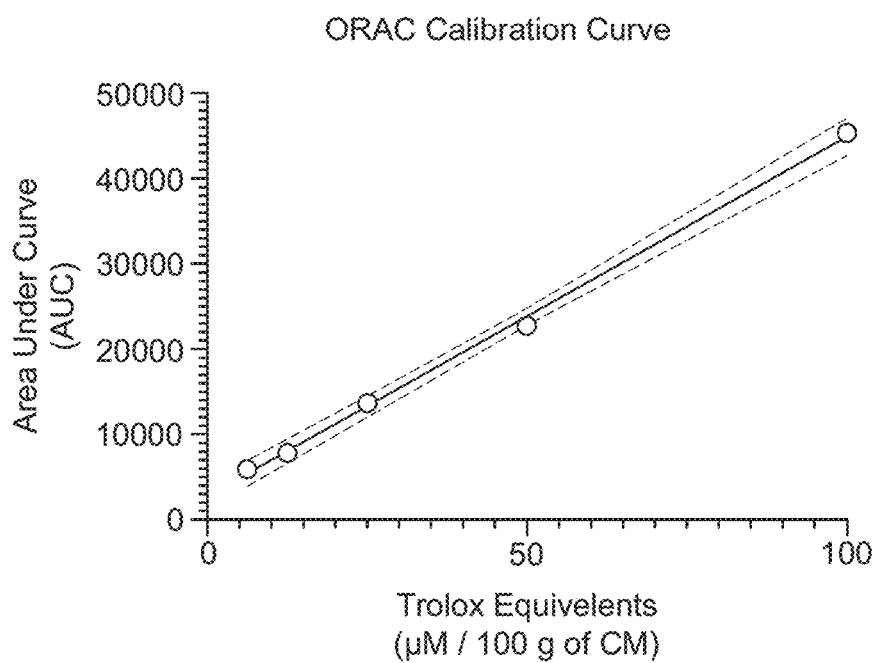

Results are shown in FIGS. 5A and 5B. Raw chaga mushroom extract had an ORAC score of ~170,000 μM Trolox Equivalents/100 g CM (rehydrated was ~4× higher due to 4-fold concentration). ~12 mL of rehydrated CM Extract (from 1,500 mL of rehydrated volume) equal to 3,500 ORAC units. 12 mL of rehydrated CM extract diluted to 355 mL (12 FL Oz) to the same volume as a soft-drink and analyzed.

Figure 6:
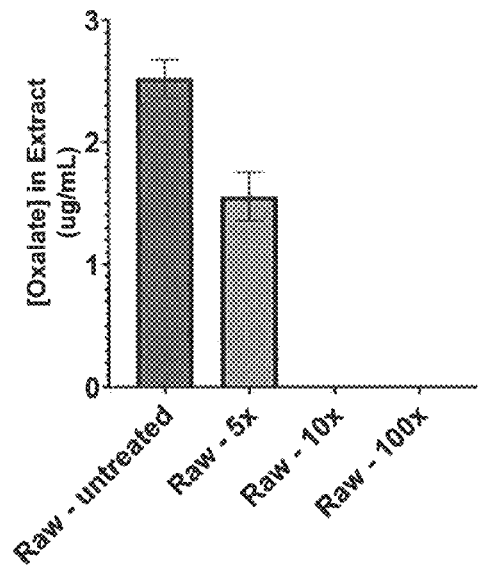
FIGS. 6 and 7 show oxalate concentration of raw CM extract (FIG. 6) and rehydrated CM extract (FIG. 7) after treatment with calcium chloride.

Oxalate concentration of diluted raw CM extract after treatment with calcium chloride are shown in FIG. 6 and summarized in Table 4.

TABLE 4

Oxalate Concentration of Raw CM Extract After Oxalate Removal

| Name | Average Oxalate Area | [Oxalate] avg ppm | Standard Deviation (ppm) |
|---|---|---|---|
| Raw - Average | 8.3 | 2.5 | 0.2 |
| Raw - 5x | TRACE | TRACE | TRACE |
| Raw - 10x | Not Detected | Not Detected | Not Detected |
| Raw - 100x | Not Detected | Not Detected | Not Detected |

All samples in replicates of 5 (n = 5)

As can be seen from the data summarized in Table 4, Raw chaga mushroom extract without treatment was quantifiable near the LLOQ at ~2.5 ppm. Raw chaga mushroom extract treated with 5 equiv. of $CaCl_2$ was found in trace quantities, but cannot be quantified due to value below the LLOQ. Raw chaga mushroom extract treated with 10 and 100 equivalents had no detectable amounts of oxalate.

Figure 7:
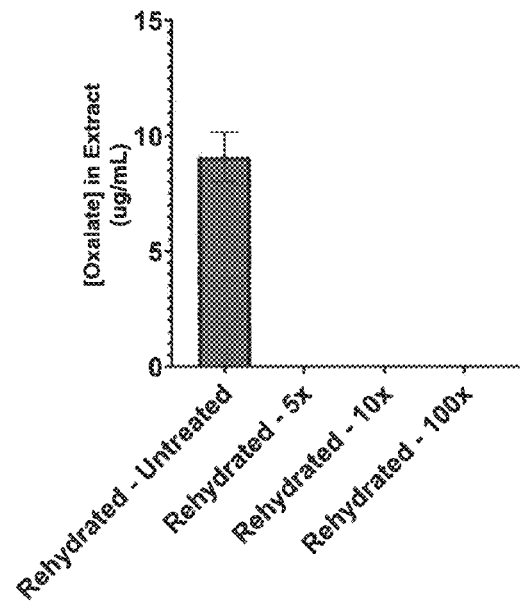

Oxalate concentration of rehydrated chaga mushroom extract after treatment with calcium chloride are shown in FIG. 7 and summarized in Table 5.

TABLE 5

Oxalate Concentration of Rehydrated CM Extract After Oxalate Removal

| Name | Average Oxalate Area | [Oxalate] avg ppm | Standard Deviation (ppm) |
|---|---|---|---|
| Rehydrated - Average | 31 | 9.1 | 1.0 |
| Rehydrated - 5x | Not Detected | Not Detected | Not Detected |
| Rehydrated - 10x | Not Detected | Not Detected | Not Detected |
| Rehydrated - 100x | Not Detected | Not Detected | Not Detected |

As can be seen from the data summarized in Table 5, raw chaga mushroom extract without treatment was quantifiable at ~9.1 ppm and raw chaga mushroom extract treated with 5, 10 and 100 equivalents had no detectable amounts of oxalate.

Water Solubility of Chaga Mushroom Extract

Figure 8A:
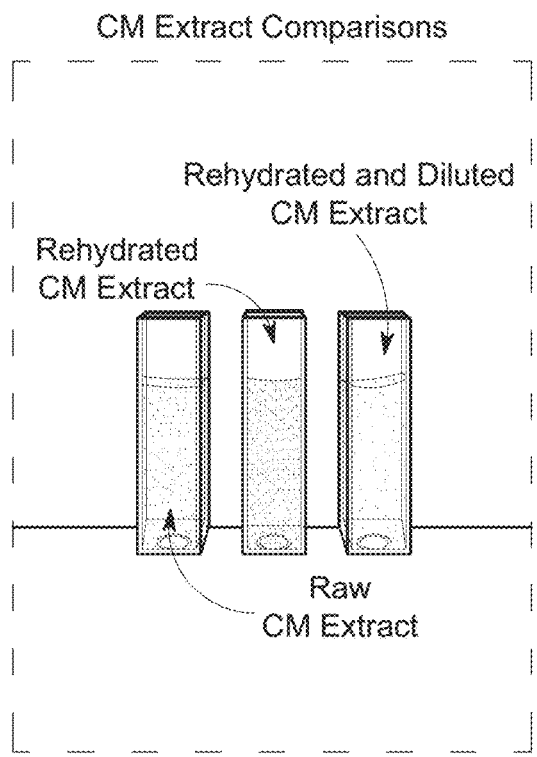
FIGS. 8A and 8B are photographs showing filtered CM extract, rehydrated CM extract, and diluted CM extract.
Figure 8B:
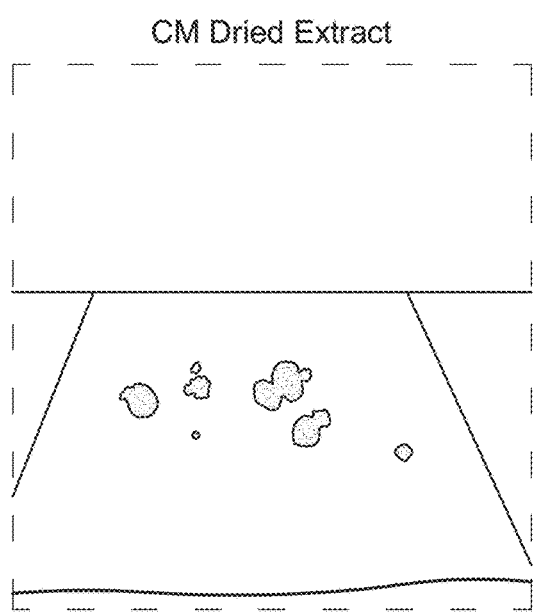

Sonication, vortex and gentle heating helps dissolve dried chaga mushroom extract at concentrations greater than 20× original concentration and the chaga mushroom extract is fully water soluble up to ~25× original concentration. As seen in FIG. 8A.

Filtered raw chaga mushroom Extract is clear (orange in color) and fully transparent with no particles or precipitate present. Rehydrated chaga mushroom extract (at a concentration of 5× raw CM extract) is fully soluble with no particles or precipitate present. Rehydrated and diluted chaga mushroom extract (concentration used in final beverage product) is clear in appearance and has an orange tincture.

Conclusions

Diluting the raw and rehydrated chaga mushroom extracts without calcium chloride treatment resulted in trace quantities of oxalate quantified in diluted extract. Result does not satisfy 'oxalate-free' marketing condition.

Raw and rehydrated extracts treated with 10× and 100× contained no quantifiable amounts of oxalate by HPLC-UV.

Raw chaga mushroom extract treated with 5× $CaCl_2$ had trace quantities of oxalate. Result does not fully satisfy 'oxalate-free' marketing condition.

Rehydrated chaga mushroom extract treated with 5× $CaCl_2$ contained no quantifiable amounts of oxalate by HPLC-UV.

Chaga mushroom extract is fully soluble in water without the formation of any precipitate or suspension.

Example 2: Water Extraction of *Inonotus Obliquus* (Chaga) Mushroom

In this study, the inventors explored the extraction of the active antioxidants from chaga mushroom using only water as the extraction agent. An exemplary method was as follows:

Method for Extracting Using Water

Add 100 g of Chaga (finely ground in coffee grinder) to a 1 L round bottom flask. Extract with 600 mL of Type 1 (nanopure) water at 85 C for 24 hours. Test sample at timed intervals over 24 hours (1, 2, 3, 4, 6, 9, and 24 hours) using ORAC.

Oxygen Radical Absorbance Capacity (ORAC Assay)

All extraction samples were diluted 200-fold in 10 mM PBS at pH 7.4. A 100 uM stock of Trolox was prepared in 10 mM PBS at pH 7.4 and subsequently diluted to create a series of standard calibrations: 0 uM, 6.25 uM, 12.5 uM, 25 uM, 50 uM, and 100 uM. 25 uL of each diluted extraction sample or standard was added to a black grenier 96-well plate. 150 uL of 4 nM fluorescein (made fresh daily) was added to each well. The outer edges of the well plate were not used for quantitation. The plate was incubated at 37 C for 30 minutes, and 25 uL of AAPH was added to each well. Fluorescein degradation was monitored at an excitation wavelength of 485 nm and emission wavelength of 528 nm on a BioTek Plate Reader every 60 seconds for 90 minutes. The kinetic curves for each sample were integrated against the blank to generate a calibration curve used to determine the oxygen radical absorbance capacity as uM Trolox equivalents per 100 g.

Figure 9A:
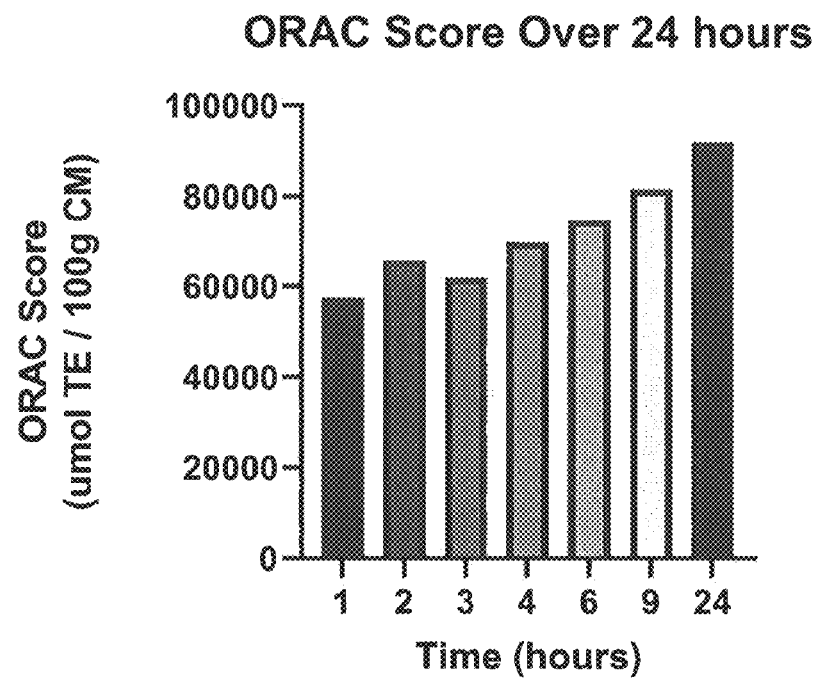
FIGS. 9A and 9B show Oxygen Radical Absorbance Capacity (ORAC) results water extraction.
Figure 9B:
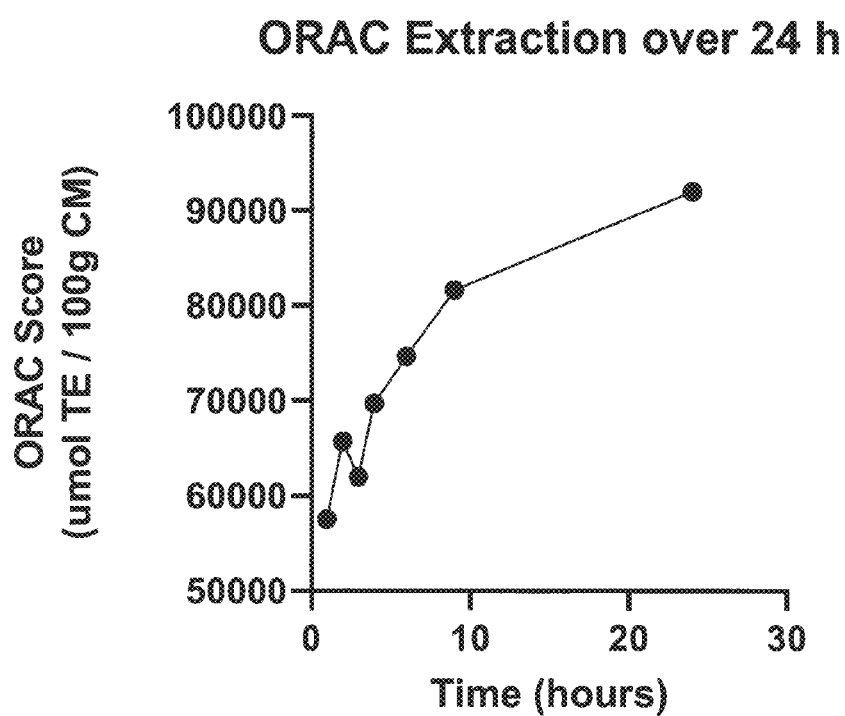

Results are shown in FIGS. 9A and 9B and summarized in Table 6.

TABLE 6

Oxygen Radical Absorbance Capacity results

| Time (hours) | ORAC Score (umol TE/100 g CM) |
|---|---|
| 1 | 57536 |
| 2 | 65694 |
| 3 | 61939 |
| 4 | 69672 |
| 6 | 74637 |
| 9 | 81592 |
| 24 | 91973 |

As seen from the data summarize in Table 6, boiling for longer periods of time increases the amount of anti-oxidants extracted from chaga mushroom extract. The extraction time appears to reach a plateau at about 24 hours and 24 hours appears to be the optimal time. However, the process can be further optimized by continually rebrewing the chaga mushroom powder with clean water (i.e. recycling).

CONCLUSIONS

Boiling for longer periods of time increases the amount of anti-oxidants extracted from CM (i.e. ORAC Score increases).

Water alone is ~110% less efficient at extracting antioxidants than water and ethanol. However, the lack of efficiency is offset by no ethanol in the extraction solvent and no need to evaporate the solvent to dryness.

All patents and other publications; including literature references, issued patents, published patent applications, and co-pending patent applications; cited throughout this application are expressly incorporated herein by reference for the purpose of providing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A method for preparing an *Inonotus obliquus* (chaga mushroom) extract, the method comprising:
   (a) extracting a chaga mushroom solid with a first solvent to produce a crude chaga mushroom extract, wherein the chaga mushroom solid is extracted at an elevated temperature of about 85° C. to about 95° C. for about 6 hours to about 24 hours;
   (b) extracting the crude chaga mushroom extract with a second solvent, wherein the crude chaga mushroom extract is extracted at an elevated temperature of about 85° C. to about 95° C. for about 6 hours to about 24 hours;
   (c) adding a salt of an alkaline earth metal to the crude chaga mushroom extract and the second solvent to precipitate an oxalic acid and/or oxalates from the crude chaga mushroom extract; and
   (d) filtering the oxalic acid and/or oxalate precipitate out of the crude chaga mushroom extract to obtain a filtered chaga mushroom extract, wherein the filtered chaga mushroom extract is substantially free of oxalic acid and/or oxalates, and wherein the filtered chaga mushroom extract has an oxygen radical absorbance capacity (ORAC) of at least 60,000 mM Trolox equivalents per 100 grams.

2. The method of claim 1, further comprising a step of removing the second solvent after adding the salt of an alkaline earth metal.

3. The method of claim 1, wherein the first solvent comprises water.

4. The method of claim 1, wherein the first solvent is an alcohol.

5. The method of claim 4, wherein the alcohol is ethanol.

6. The method of claim 1, wherein the chaga mushroom solid is extracted at an elevated temperature of about 85° C. to about 90° C.

7. The method of claim 1, wherein the chaga mushroom solid is extracted at an elevated temperature of about 90° C. to about 90° C.

8. The method of claim 1, wherein the second solvent is water.

9. The method of claim 1, wherein the crude chaga mushroom extract is extracted at an elevated temperature of about 85° C. to about 90° C.

10. The method of claim 1, wherein the crude chaga mushroom extract is extracted at an elevated temperature of about 90° C. to about 90° C.

11. The method of claim 1, further comprising a step of introducing the filtered chaga mushroom extract into a liquid, a solid, or a semi-solid to form a food product.

12. The method of claim 1, wherein:
   in step (a) the chaga mushroom solid is extracted at an elevated temperature of about 85° C. to about 95° C. for about 12 hours to about 24 hours; and
   in step (b) the crude chaga mushroom extract is extracted at an elevated temperature of about 85° C. to about 95° C. for about 12 hours to about 24 hours.

13. The method of claim 12, wherein the filtered chaga mushroom extract is fully soluble with substantially no particles or precipitate present.

14. The method of claim 1, wherein the filtered chaga mushroom extract is fully soluble with substantially no particles or precipitate present.

15. A filtered chaga mushroom extract prepared using the method of claim 1.

16. A food product comprising the filtered chaga mushroom extract prepared using the method of claim 1.

17. A method for preparing an *Inonotus obliquus* (chaga mushroom) extract, the method comprising:

(a) extracting a chaga mushroom solid with a first solvent to produce a crude chaga mushroom extract, wherein the chaga mushroom solid is extracted at an elevated temperature of about 85° C. to about 95° C. for about 6 hours to about 24 hours;

(b) extracting the crude chaga mushroom extract with a second solvent comprising a salt of an alkaline earth metal to precipitate an oxalic acid and/or oxalates from the crude chaga mushroom extract, wherein the crude chaga mushroom extract is extracted at an elevated temperature of about 85° C. to about 95° C. for about 6 hours to about 24 hours; and (c) filtering the oxalic acid and/or oxalate precipitate out of the crude chaga mushroom extract to obtain a filtered chaga mushroom extract, wherein the filtered chaga mushroom extract is substantially free of oxalic acid and/or oxalates and wherein the filtered chaga mushroom extract has an oxygen radical absorbance capacity (ORAC) of at least 60,000 mM Trolox equivalents per 100 grams.

18. The method of claim 17, further comprising removing the second solvent from the filtered chaga mushroom extract.

19. The method of claim 17, wherein the chaga mushroom solid is extracted at an elevated temperature of about 85° C. to about 90° C.

20. The method of claim 17, wherein the chaga mushroom solid is extracted at an elevated temperature of about 90° C. to about 87° C.

21. The method of claim 17, wherein the crude chaga mushroom extract is extracted at an elevated temperature of about 85° C. to about 90° C.

22. The method of claim 17, wherein the crude chaga mushroom extract is extracted at an elevated temperature of about 90° C. to about 87° C.

23. The method of claim 17, wherein the salt is in an amount 10× (mol/mol) or more of an amount of oxalic acid or oxalate in the chaga mushroom solid.

24. The method of claim 17, wherein the salt is in an amount 50× or more of an amount of oxalic acid or oxalate in the chaga mushroom solid.

25. The method of claim 17, wherein the second solvent is water.

26. The method of claim 17, wherein:
in step (a) the chaga mushroom solid is extracted at an elevated temperature of about 85° C. to about 95° C. for about 12 hours to about 24 hours; and
in step (b) the crude chaga mushroom extract is extracted at an elevated temperature of about 85° C. to about 95° C. for about 12 hours to about 24 hours.

27. The method of claim 17, wherein the filtered chaga mushroom extract is fully soluble with substantially no particles or precipitate present.

* * * * *